United States Patent [19]

Wong et al.

[11] Patent Number: 4,623,232
[45] Date of Patent: * Nov. 18, 1986

[54] CAMERA WITH IMPROVED FILM LEADER CAPTURING MEANS

[75] Inventors: Wan C. Wong, North Point, Hong Kong; Shigeru Oshima, Tokyo, Japan

[73] Assignee: W. Haking Enterprises Limited, North Point, Hong Kong

[*] Notice: The portion of the term of this patent subsequent to Jun. 25, 2002 has been disclaimed.

[21] Appl. No.: 676,080

[22] Filed: Nov. 29, 1984

Related U.S. Application Data

[63] Continuation-in-part of Ser. No. 477,247, Mar. 21, 1983, Pat. No. 4,525,048.

[51] Int. Cl.⁴ .......................... G03B 1/12; B65H 75/28
[52] U.S. Cl. .................................. 354/173.1; 242/71; 242/74; 354/212
[58] Field of Search ........ 354/173.1, 173.11, 212–216; 242/68.5, 74, 71, 71.1, 71.2, 71.4, 715

[56] References Cited

U.S. PATENT DOCUMENTS 3,439,881  4/1969  Ulmschneider .................. 242/74 X

FOREIGN PATENT DOCUMENTS 910487    11/1962  United Kingdom .................. 242/71
1087967   10/1967  United Kingdom .
1107823   3/1968   United Kingdom .
1123402   8/1968   United Kingdom .
1123403   8/1968   United Kingdom .
1165746   10/1969  United Kingdom .

Primary Examiner—Michael L. Gellner
Attorney, Agent, or Firm—Russell E. Hattis; Stephen R. Arnold

[57] ABSTRACT

The camera preferably has a slotted take-up spool which when the film compartment covering door is opened is automatically rotated into an ideal position where a hook in a film-capturing slot thereof has an outward facing orientation ideal for capturing a film leader perforation when the film leader is inserted therein. The slot is preferably configured as a lengthwise passage leading into a hollow axially disposed chamber within the take-up spool, the trailing edge of the slot nearest the imaging station being provided with the hook. This edge is positioned so that it does not come into confronting engagement with the film during initial advance thereof until the film is firmly captively secured over the hook.

14 Claims, 8 Drawing Figures

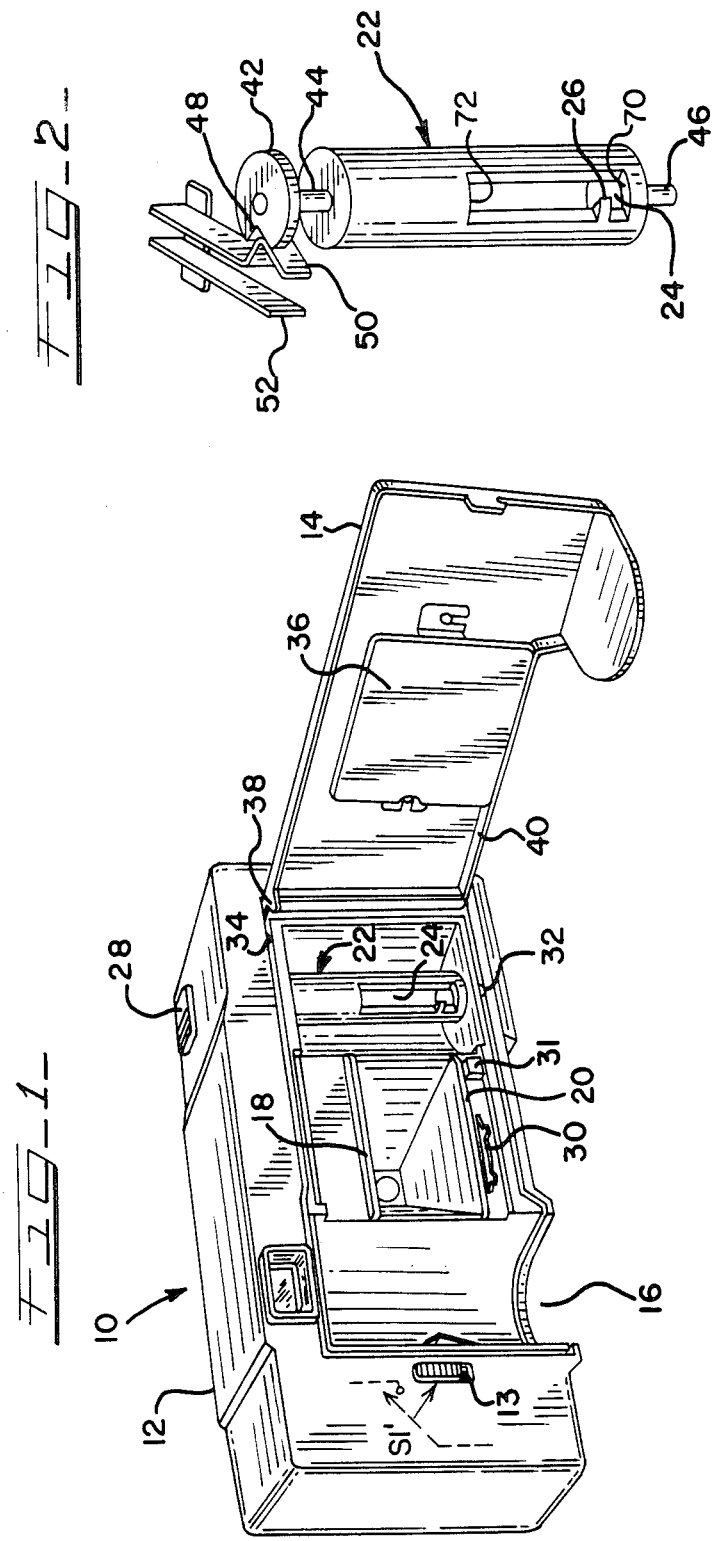

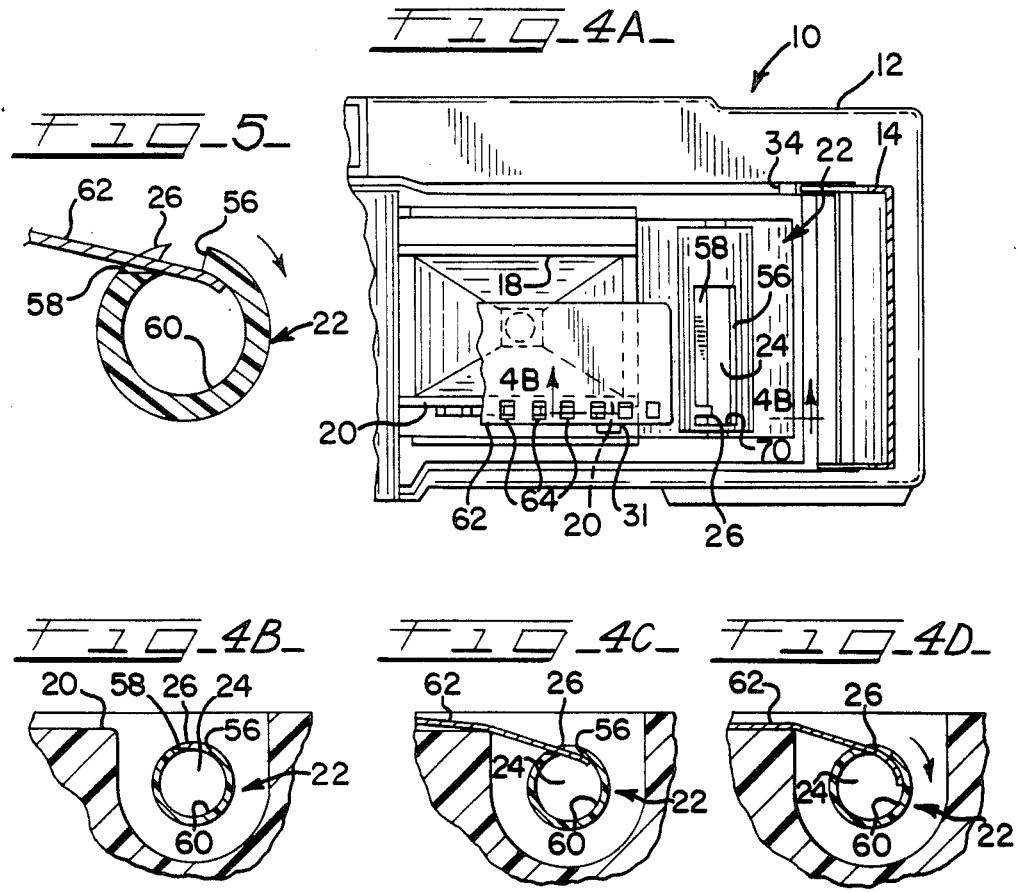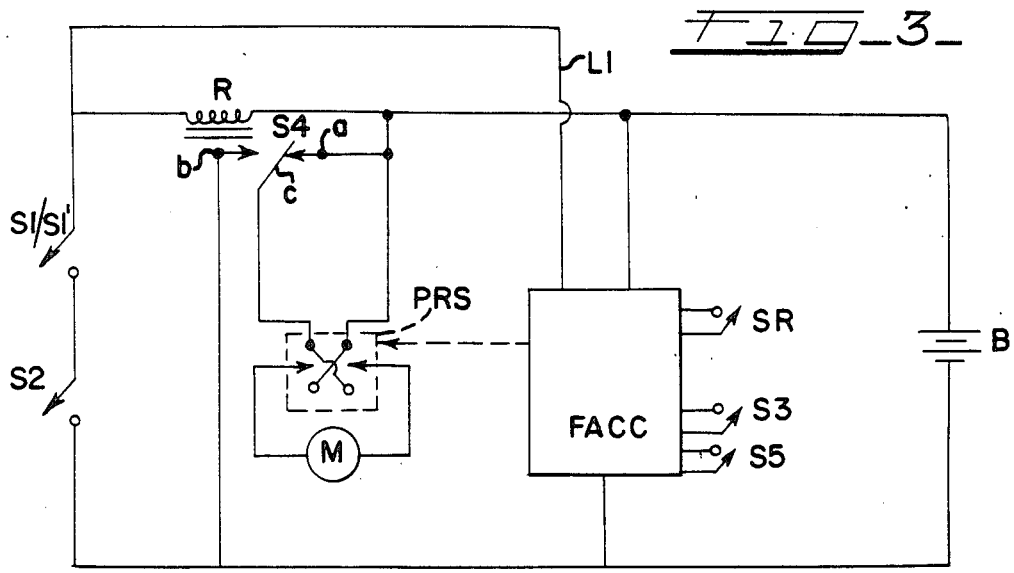

CAMERA WITH IMPROVED FILM LEADER CAPTURING MEANS

RELATED APPLICATIONS

This application is a continuation-in-part of U.S. application Ser. No. 477,247 filed Mar. 21, 1983.

DESCRIPTION

1. Technical Field

The present invention relates generally to a still camera of the 35 mm type having a swing-open back door which when open exposes the interior of the camera housing for film loading, and, more particularly, to a unique take-up spool design and positioning control therefor which ensures receipt and reliable capture of a film leader in a slot therein when the take-up spool is subsequently rotated.

2. Background Prior Art

In the field of electrically operated 35 mm cameras there exists a variety of means whereby the camera may be loaded rapidly and easily. A variety of approaches have been used to accomplish this. One is disclosed in U.S. Pat. No. 4,416,525. An unslotted take-up spool with one or more slightly radially projecting film-engaging capture hooks disposed to engagingly capture a film leader driven over and around the take-up spool by a sprocket, motor-driven through a slip-clutch when the shutter release button is depressed. Here the user need not bother about threading the film leader through a slot in the take-up spool, as was required by conventional cameras where occasionally a hook on the spool projecting into the slot failed to capture a film aperture, thereby making it impossible to advance the film. Such film capture failure is believed due to the fact that the slot and capture hook are not ideally positioned or formed to ensure capture of the film leader. In the patent described above, to insure that the capture hooks disengage without tearing the film on rewind, the take-up spool is driven overspeed with respect to the cassette take-up rate during rewind, so as to shuffle the film off automatically. Where cost reduction is the principal objective, as in the case of the present invention, the prior requirement that the user place the film leader in a take-up spool slot is retained, but the leader capture reliability is enhanced by the features of the invention to be described, which involve less expensive mechanism that that disclosed in said patent. Other less desirable prior approaches to take-up spool film capture use a friction coating such as a synthetic rubber-like coating around the take-up spool, and loading gates and feeding shoes to insure that the film is fed around the spool during initial leader advance to secure at least one tight turn thereabout. Both of the aforementioned systems tend to be inherently complex, and therefore expensive as opposed to the long-standing method of inserting the film into or through a suitably disposed capturing slot in the take-up spool.

While not a requirement of the broad aspects of the present invention, in a motor driven embodiment thereof, as in said patented camera, it is desirable that some form of tension-sensing film feed control be incorporated into the camera, wherein the sudden build-up of film tension at and end-of-film condition in the take-up spool is sensed by one means or another to disable further film advance, or to automatically switch the camera into a rewind drive configuration, where the film is automatically rewound into the cassette. Such tension-responsive systems place a rather substantial load upon the take-up spool drive, and hence on the take-up spool itself, which must be sufficiently rugged to withstand the tension surges involved. A simple, rugged, small one-piece take-up spool, preferably made as a single molded plastic part, and capable of absorbing these tension surges without fracture would be a desirable feature of the most preferred form of the invention.

Prior to the present invention, to the applicant's knowledge, there has not been provided an inexpensive film-capture system for a back-loading 35 mm camera which is easily threaded in under adverse lighting conditions without the use of special guide shoes or related paraphenalia, which preserves the requisite structural integrity of a small diameter take-up spool under high stress conditions, and which is of simple one-piece inexpensive construction.

SUMMARY OF THE INVENTION

According to a feature of the invention the camera features a motor driven take-up spool having a wide-aperture film-capturing slot having a film-engaging hook therein, the camera featuring a means preferably motor driven which enables the positioning of the take-up spool in a precise position so as to present the take-up spool slot in an optimum position for placement and capture of the film leader. In the preferred form of the invention, where the camera uses an electric motor for film wind and rewind, the take-up spool is automatically moved into this optimum position by this same motor responsive to opening of the camera loading door attendant to a film loading operation. To that end, position sensing switching means are provided associated with the take-up spool which, in conjunction with a door-actuated switch, energizes the motor to cause a partial rotation of the spool to the ideal loading position.

In accordance with a specific aspect of the invention, the take-up spool slot has a unique size and shape. Thus, instead of being a narrow slot formed in the periphery of a cylindrical, thin, hollow shell forming the take-up spool, with a hook projecting substantially into the slot, as in the case of the take-up spool disclosed in said copending application Ser. No. 477,247, the slot has a much greater width and the capture hook projects only slightly into the slot. Also the slot is preferably formed in a take-up spool which is a thick-walled, hollow, cylindrical, synthetic plastic molded part. The slot, which will be more fully described hereafter, permits a unique placement and construction of the captured tooth. Also, the take-up spool can then take the forces built up therein when film tension responsive means are incorporated in the camera as previously described.

The concept of providing a means for positioning the take-up spool in a precise optimum position, such as by an electric motor drive responding to the opening the of the film chamber door, is disclosed in applicant's copending application Ser. No. 477,247, filed Mar. 21, 1983. This invention as shown therein is applied to a half-frame, drop-in loading camera. Unlike conventional 35 mm full frame cameras, the film cartridge and film leader are inserted edgewise into small slots and openings in the camera housing end wall, and the user has no access to the film leader once the cartridge is inside the camera. There is also no full view of the take-up spool slot to aid the operator to place the film leader into the slot the slot opens the axial end of the spool. When the take-up spool is properly positioned, the film leader-receiving slot automatically is aligned with another slot in the camera end walls so that the film leader is guided thereby into the take-up spool slot upon dropping of the film into the camera. The automatic spool positioning means is here a practical necessity. Thus, to provide an automatic means for positioning the take-up spool in a pre-determined position where the poorly visible slot is aligned with the plane of the end of the film leader would not necessarily suggest such an automatic positioning feature in a camera where the take-up spool slot and film leader are fully visible and accessible.

In the preferred form of the invention, when the film chamber door is opened to fully expose the film chamber, the take-up spool is automatically moved into its ideal position. The user merely drops the cassette into the cassette-receiving chamber and then places the end of the film leader into the take-up spool slot without other special threading operations. On closure of the door, pressure on the film leader is then such as to present the film leader in an ideal position to be captured by the hook on the take-up spool as soon as the take-up spool is advanced in a film winding direction. Film advancement can be automatically initiated by closure of the door or by subsequent operation of the shutter release button.

Other advantages and features of the invention will become apparent upon making reference to the specification, claims, and drawings to follow.

BRIEF DESCRIPTION OF DRAWINGS

FIG. 1 is a perspective view of a back-loading 35 mm camera with the back open prior to loading and showing the take-up spool film slot properly positioned for film threading;

FIG. 2 is a partial perspective view of the take-up spool of FIG. 1, and additionally showing a sector cam affixed thereto and rotatably operating a feeler switch according to the position of the take-up spool with respect to the camera housing;

FIG. 3 is a representative circuit providing for automatic orientation of the take-up spool attendant to opening the camera back to the configuration indicated in FIG. 1 by selectively actuating associated internal electric motor drive means;

FIG. 4A is a cross section view along the section lines 4A—4A indicated in FIG. 1 where the camera is oriented so that the film compartment is open at the top of the camera housing and showing the take-up spool properly positioned for film loading;

FIG. 4B is a partial plan view of the take-up spool of FIG. 1 in the vicinity of the film-loading slot, also showing a film leader proximate to the take-up spool just prior to engagement therewith;

FIG. 4C is a view of the camera similar to that shown in FIG. 4A, and showing a film leader loosely hooked to the take-up spool prior to closure of the camera door;

FIG. 4D is a view similar to that shown in FIG. 4C after an initial partial rotation of the take-up spool in a film-advancing direction and;

FIG. 5 is an enlarged view of the central portions of FIG. 4A.

DETAILED DESCRIPTION OF THE INVENTION

FIG. 1 shows an electrically operated camera of generally conventional design to which the teachings of the present invention are applied. The camera 10 features a housing 12 having a cassette-receiving chamber 16, a take-up spool 22, a pair of film guide rails 18, 20 integral with the housing 12, a film advance metering sprocket 30, a pushbutton 28 serving to actuate the shutter and to automatically initiate advance of a subsequent film advance by electric motor drive means (not shown), and an end-of-film switching member 32 for disconnecting the motor drive system when the film leader has been rewound clear of the take-up spool 22. Also shown is hinged swing-open film compartment closure door 14 secured in a closed position by a latch 13 and carrying a customary pressure plate 36 which serves to flatten the film against the guide rails 18 and 20 when the door is closed. In particular, there are mounted in the housing switch actuating members 34 and 32 configured to be actuated responsively to opening or closure of the door 14 by engagement with a corresponding tang 38 or a shelf 40 respectively, each being integral with the door 14. The upper switch member 34 may be associated with conventional switching reset means for reconfiguring the electronic circuitry (not shown) of the camera from a rewind to a forward film advancing configuration responsively to either opening or closing the door 14. Switch member 32, similarly responsively actuated by movement of the door 14 between opened and closed positions, serves to actuate special drive circuitry for driving the take-up spool 22 to present the film leader loading slot 24 to be oriented properly outward for the next film loading operation.

The take-up spool is shown as a thick-walled cylinder 22 having an unusually wide film leader-receiving slot 24 terminating at widely separated end walls 70, 72. This slot and associate capture hook 26 are shown in detail in FIG. 2 and in FIGS. 4A–4D at various phases of the capture process. FIG. 4A shows the orientation of the film loading slot 24 properly positioned for loading when the camera housing is resting on its front wall so that the film compartment open onto the top thereof. FIG. 4B is a partial plan view of the take-up spool shown in FIG. 4, with the slot 24 similarly positioned, i.e. facing directly outward from the housing 12. The film loading slot 24 is configured only slightly longer than a width of the leader end of a standard film 62 so that the end perforations 64—64 thereon will be properly aligned with respect to the capture hook 26 when the end is inserted into the slot 24. With particular respect to the slot configuration, and its relationship to the horizontal surface of the guide rail 20 (see also FIG. 1), it will be noted that the slot is defined in its long direction by two inwardly extending walls 56, 58 hereinafter referred to as the leading and trailing walls respectively. The leading wall 56 is shown extending in almost a vertical direction and is formed by a substantially radial cut through the relatively thick-walled take-up spool cylinder 22 and accessing a cylindrical leader-accepting interior chamber having a defining interior wall 60. The trailing wall 58, on the other hand, is disposed to lie generally horizontally (and thus makes a substantial angle to a radial line). Also it is out of alignment with respect to the plane of the captured film leader, so that at most only the radially innermost portion of the trailing wall 58 contacts the film prior to initial advance thereof.

The trailing wall 58 has near one end thereof a locally circumferentially extending hook 26 extending in a leading or film-advancing direction therefrom. The outer periphery 26a of the hook is a continuation of the cylindrical outer periphery of the take-up spool and it terminates in a depending surface 26c forming a film aperture capture point or edge 26b. It will be noted that as viewed from directly above the loading slot 24 (FIG. 4B), the leading edge 26b of the hook 26 extends only slightly beyond the rightmost projection of the trailing wall. FIG. 4C shows the film leader extended beyond the position shown in FIG. 4B so that the hook 26 captures one of the perforations 64. Here the film is only loosely extending over the guide rail 20, the door not yet having been closed. It will be further noted that the radially outermost portions of the trailing wall 58 are not yet in contact with the film 62. FIG. 5 shows a portion of the spool 22 in more detail with respect to this phase of capture.

FIG. 4D shows the orientation of the take-up spool and the film after a modest portion of initial film advance, and wherein the entire trailing wall 58 has been brought into contact with the proximate surface of the film 62. Here it will be noticed that the film is now fully engaged on the capture hook 26, being fully flattened against the surface of the trailing wall 58. A relatively thick-walled take-up spool is provided to insure adequate mechanical strength. It will be appreciated that if the trailing wall 58 were not so angled back with respect to the capture region of the film as shown in FIG. 4C, there would be a strong likelihood that a conventionally radially oriented trailing wall configured similarly to the leading wall 56 might well cam the film out of engagement with the hook 26, thereby causing feeding failure and loss of film.

Further, it will be noted, with particular respect to FIG. 4B, that the relative orientation of the leading and trailing walls 56, 58 provides a relatively wide range of initial insertion angles of the film leader; i.e. the orientation of the leader need not be precise in order to secure reliable film capture. Thus, the effective insertion area of the take-up spool 22 is raised, without substantially impairing the structural integrity of the take-up spool itself. Also this geometry provides a secure anchoring for the hook 26 over a distance substantially greater than would be provided by a radially disposed leading wall such as 56, since the effective area of anchorage between the hook 26 and the trailing wall 58 is substantially greater than the thickness of the annulus defined between the outer surface of the takeup spool 22 and interior wall 60 thereof. By this means additional strength is imparted to the take-up hook as well.

With respect to the aforementioned take-up spool positioning system, FIG. 2 shows in partial form the take-up spool 22 having mounting shafts 44, 46 affixed to conventional bearing and drive means (not shown) and further having a sector cam 42 affixed to one end thereof. A sector 48, constituting an inward extension of a radial portion of the outer surface of the cam 42 slidingly engages an appropriately shaped sensor blade 50 to drive the sensor blade in an oscillatory motion between extreme positions according to the orientation of the cam 42 as the take-up spool is rotated by the motor drive means. A sensor contact 52 is positioned to confront the sensor blade 50, these two contacts constituting elements of a switch S2 (see FIG. 3). Rotation of the take-up spool 26 holds the sensor blade 50 and the sensor contact 52 in a closed condition thereby completing the electrical circuit therebetween until the take-up spool is rotated to the appropriate position shown in FIG. 1 (see also FIG. 4A), whereupon the sensor blade 50 springs to a circuit-opening condition.

FIG. 3 shows a representative circuit for automatically repositioning the take-up spool 22 when the door 14 is opened after rewind. A modified conventional motor driven film advance control circuit is shown. The conventional portions of this circuit are represented by a film advance control circuit FACC powered by a battery B and responsive through actuation of switch S3 (responsively coupled to pushbutton 28) to energize a relay coil R for a predetermined period via line L1, which completes the circuit from relay coil R to the opposite side of battery B. The movable contactor C of a single pole double throw relay-energized contacting system alternatively throws a short circuit across the motor M connected between terminals A and C of switch S4 to brake film advance, or when the contactor C contacts terminal B, applies electrical drive to the motor M from the battery B. Control of the motor direction is controlled by a polarity of reversing switch PRS having its switching state responsive to the internal switching condition of the film advance control circuit FACC. The film advancing control circuit FACC is reset to the forward configuration by well-known means according to the settings of the end-of-film sensing switch associated with the switch member 31 of FIG. 1, and a door-actuated switch SR operatively associated with the door actuated switch member 34. A variety of means are well-known in the art for accomplishing such programmed reversal of the motor drive polarity via the polarity switch PRS according to these switch sensings.

With respect to the present invention, upon termination of rewind, and with the film advancing control circuit preferably designed to set the polarity reversing switch PRS to forward (advancing) polarity, opening the camera door allows switch member 32 to close its associated switch S1. In the event that the slot 24 (FIG. 2) is not properly positioned, switch S2, corresponding to sensor blade 50 and sensor contact 52, will be in a closed-circuit condition. Thus, it will be seen that one end of the coil of the relay R will be grounded, resulting in the energization of the relay to cause the movable contactor C to contact terminal B. This causes electrical power to be delivered to the motor M from the battery B. The take-up spool will therefore be immediately energized to a forward direction, rotation continuing until the cam sector 48 causes sensor blade 50 to move away from the sensor contact 52, thereby breaking this circuit and terminating motor drive power. At this point, the slot 24 is properly facing outward form film insertion.

Thus, there has been described a convenient and inexpensive system for reliably threading the film into a 35 mm (or similar) camera having a swing-open back, and having all of the advantanges of a narrow diameter take-up spool, and overcoming many of the principal drawbacks thereof as previously outlined in the Background Prior Art. By automatically positioning a single slot in the take-up spool at optimum position for accepting a film leader, and by optimally positioning the dimensions of the aperture itself, its defining walls, and the capture hook thereon, a reliable and inexpensive system is provided which allows for an inexpensive solution to the problems previously outlined.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the scope of the claimed invention not be limited to a particular embodiment disclosed as the best mode contemplated for carrying out the invention, but that the scope of the claimed invention will include all embodiments and equivalents falling within the scope of the general principles disclosed herein.

Thus, for example, a great variety of sensing means may alternatively be used in use of the cam-actuated slot positioning switch previously described. Such variants as a suitably placed commutator-type switch may equally well be employed, as may a variety of other electrical sensing means, including optical sensing means. Further, although the present disclosure describes momentarily actuating the motor drive circuitry to reorient the take-up spool by driving the spool in a forward or film-advancing direction responsively to switching circuitry actuated by opening the loading door, clearly similar circuitry could readily be devised which would respond to actuation of the end-of-film sensor which terminates the rewind operation. Alternatively the door latch 13 itself could be coupled to switching means ($S_1^1$ FIG. 1) so that unlatching the door actuates the reorientation drive. The designation of the actuating switch in FIG. 3 as "$S_1/S_1'$" indicates that this switch may be placed in either of the two locations. Moreover, once the film has disengaged after rewind, the switching circuitry could be adapted to continue the rewind drive of the take-up spool until it is properly positioned. In short, switching means responsive either to an end-of-film condition, or to operations attendant to the opening of the camera door may be used to drive the take-up spool either in an advancing or a rewinding direction to position the slot for the next loading operation.

We claim:

1. In a still camera including a housing having a film compartment with a cassette-chamber at one side of an imaging station and for receiving a film cassette with an apertured film leader extending therefrom, film guide surface means on opposite sides of said imaging station against which said film can be flattened, a take-up spool chamber disposed on the opposite side of said imaging station and having a take-up spool therein, said take-up spool having a slot means for accepting a film leader to be manually inserted into said slot means, said slot means having hook means for capturing the apertured portion of the film leader inserted thereinto, said spool being movable into a given most ideal position where said hook means can most effectively capture the apertured portion of said film leader, said camera further having a door movable between a film compartment closing position to a film compartment exposing position where said cassette-receiving chamber and the length of said take-up spool are exposed for cassette and leader insertion, said door when closed pressing said film flat against said guide rail means, electric motor drive means for driving said take-up spool in at least a film advancing direction so as to feed subsequent frames of fresh film to said imaging station, and rewind means for rewinding said film from said take-up spool back to said dispenser, the improvement comprising:

switching means responsive to the position of said take-up spool in a position other than said ideal position for momentarily energizing said motor drive means to position said take-up spool slot means in said ideal position.

2. The camera of claim 1 wherein said switching means is coupled to said door to energize said motor means to orient said take-up spool to said ideal position responsively to movement of said door to said film compartment exposing position when said take-up spool is in other than said ideal position.

3. The still camera of claim 2 wherein said door when closed presses said film flat against said guide rail means.

4. The camera of claim 2 wherein said take-up spool has an axially extending chamber therein, said slot means is a generally axially extending passage communicating between the outer surface of said take-up spool and said chamber, said passage being defined by two widely separated end walls and a pair of axially extending generally confronting walls diverging away from each other in an outward direction away from the rotational axis of said spool.

5. The camera of claim 4 wherein said slot-passing passage in said ideal position of said take-up spool faces generally in the direction of said imaging station and film guide surface.

6. The camera of claim 5 wherein said take-up spool has a cylindrical outer surface, said axially extending wall of said passage furthest from said imaging station when said take-up spool is in said ideal position extending in a generally radial direction to the cylindrical surface of said take-up spool, the other axially extending wall of said passage then closest to said imaging station defining an axially-extending surface at a substantial angle to a radial plane, and said hook means being a projection from said axially extending surface.

7. The camera of claim 6 wherein said hook means projection has a cylindrical outer periphery forming a continuation of the cylindrical periphery of said take-up spool and terminating in a generally radially extending surface to form a film leader aperture-capturing capturing edge facing in a direction away from said imaging station.

8. The camera of claim 5 wherein said hook means when said take-up spool is in said ideal position projects from said axially extending passage wall nearest said imaging station and said hook means has an aperture-capturing edge facing in a direcation away from said imaging station.

9. The camera of claim 8 wherein the latter axially extending wall is configured so that only the radially innermost portions thereof contacts the film during initial film advance after loading, and so that during a subsequent portion of the initial film advance after loading substantially the entire remainder of said wall comes into confronting engagement with a portion of the film.

10. The camera of claim 1 wherein said switching means includes cam means rotated with said take-up spool, said cam means actuating said switching means between open and closed positions thereof according to the angular position of said take-up spool.

11. The camera of claim 1 or 10 further including latch means operable between unlocking and released positions for releasably securing said door in a closed position, and wherein said switching means is coupled to energize said motor means to orient said take-up spool to said ideal position responsively to operation of said door from a locked and closed condition to a film compartment-exposing position when said take-up spool is in other than said ideal position.

12. In a camera having a film take-up spool adjacent an imaging station and provided with at least one slot means therein for accepting and capturing the end of a film leader inserted thereinto, said camera further having means for rotating said take-up spool to a chosen ideal loading orientation of said slot means, the improvement wherein said take-up spool has an axially extending chamber therein, said slot means is configured as a generally axially extending passage communicating between the outer surface of said take-up spool and said chamber, said passage is defined by two widely separated end walls and pair of axially extending walls diverging away from each other in an outward direction away from the rotational axis of said spool, the axially extending passage wall nearest the imaging station when the take-up spool is in said ideal orientation is provided with hook means circumferentially extending therefrom in a film advancing direction, and wherein the latter wall is configured so that during initial film advance after capture of a film by said hook means only the radially innermost portions of said wall contact the film, and so that during a subsequent portion of initial film advance substantially the entire remainder of said trailing wall comes into confronting engagement with a portion of said inserted film.

13. The camera of claim 1, 2, or 12 wherein said take-up spool has only a single axial slot therein.

14. In a still camera including a housing having a film compartment with a cassette-receiving chamber at one side of an imaging station and for receiving a film cassette with an apertured film leader extending therefrom, film guide surface means on opposite sides of said imaging station against which said film can be flattened, a take-up spool chamber disposed on the opposite side of said imaging station and having take-up spool therein, said take-up spool having a slot means for accepting a film leader to be manually inserted into said slot means, said slot means having hook means for capturing the apertured portion of the film leader inserted thereinto, the improvement comprising means for automatically moving said take-up spool into a given most ideal position where said hook means can most effectively capture the apertured portion of said film leader, responsively to opening said door.

\* \* \* \* \*